(12) United States Patent
Sprague et al.

(10) Patent No.: US 10,200,473 B2
(45) Date of Patent: Feb. 5, 2019

(54) METHODS AND SYSTEMS FOR MANAGING NETWORKED STORAGE SYSTEM RESOURCES

(71) Applicant: NETAPP, INC., Sunnyvale, CA (US)

(72) Inventors: John Jason Sprague, Westford, MA (US); James Stephen Holden, Concord, MA (US); Omri Kessel, Newton, MA (US); John Strunk, Cary, NC (US); Andrew Joseph Klosterman, Cary, NC (US)

(73) Assignee: NETAPP, INC., Sunnyvale, CA (US)

( * ) Notice: Subject to any disclaimer, the term of this patent is extended or adjusted under 35 U.S.C. 154(b) by 201 days.

(21) Appl. No.: 15/467,316

(22) Filed: Mar. 23, 2017

(65) Prior Publication Data
US 2018/0278686 A1    Sep. 27, 2018

(51) Int. Cl.
| | |
|---|---|
| *G06F 9/50* | (2006.01) |
| *H04L 12/861* | (2013.01) |
| *G06F 3/12* | (2006.01) |
| *G06F 3/06* | (2006.01) |
| *G06F 17/30* | (2006.01) |
| *H04L 12/26* | (2006.01) |
| *H04L 29/08* | (2006.01) |

(52) U.S. Cl.
CPC .......... *H04L 67/1097* (2013.01); *G06F 3/06* (2013.01); *G06F 3/12* (2013.01); *G06F 9/50* (2013.01); *G06F 17/30094* (2013.01); *G06F 17/30106* (2013.01); *G06F 17/30144* (2013.01); *G06F 17/30203* (2013.01); *H04L 43/04* (2013.01); *H04L 49/90* (2013.01)

(58) Field of Classification Search
CPC ..... G06F 3/06; G06F 3/12; G06F 9/50; G06F 17/30; H04L 67/10; H04L 49/90
See application file for complete search history.

(56) References Cited

U.S. PATENT DOCUMENTS

| | | | |
|---|---|---|---|
| 9,398,117 B2 | 7/2016 | Kangarlou Haghighi et al. | |
| 2010/0195538 A1* | 8/2010 | Merkey | H04L 43/02 370/255 |
| 2014/0136680 A1* | 5/2014 | Joshi | H04L 43/026 709/224 |
| 2015/0124622 A1* | 5/2015 | Kovvali | H04W 28/0215 370/236 |

* cited by examiner

*Primary Examiner* — Shirley X Zhang
(74) *Attorney, Agent, or Firm* — Klein, O'Neill & Singh, LLP

(57) ABSTRACT

Methods and systems for a networked storage environment are provided. One method includes mirroring a plurality of requests from a switch and transmitting the mirrored plurality of requests to a remote acquisition unit; extracting application layer protocol data units from assembled transport layer packets; parsing the application layer protocol data units to obtain file system requests; identifying storage volume identifiers from the parsed file system requests that are associated with a greatest number of operations; identifying network addresses for client systems initiating the greatest number of operations for the storage volumes and network addresses of target storage systems managing the storage volumes; and providing a total number of operations for the plurality of requests in a given time, the identified storage volume identifiers, the network addresses of the client systems and the network addresses of the target storage systems to a management console.

20 Claims, 13 Drawing Sheets

METHODS AND SYSTEMS FOR MANAGING NETWORKED STORAGE SYSTEM RESOURCES

TECHNICAL FIELD

The present disclosure relates to networked storage environments and more particularly, to innovative computing technology for monitoring and managing various resources that are used by the networked storage environments for storing and retrieving electronic data.

BACKGROUND

Various forms of storage systems are used today. These forms include direct attached storage (DAS) network attached storage (NAS) systems, storage area networks (SANs), and others. Networked storage systems are commonly used for a variety of purposes, such as providing multiple users with access to shared data, backing up data, and others. A networked storage system typically includes at least one computing device executing a storage operating system for storing and retrieving data on behalf of one or more client computing systems ("clients"). The storage operating system stores and manages shared data containers in a set of mass storage devices.

Networked storage systems are used extensively in NAS, SAN, cloud based, and virtual storage environments. The infrastructure uses various physical and virtual components, for example, servers, switches, host bus adapters, network interface cards, storage devices, volumes, virtual machines, and others. The performance and usage of these resources impacts the overall performance providing storage services to clients.

Prior to the described innovative technology below, computing servers typically connect to networked storage using for example, the Ethernet protocol. In some environments, numerous client systems (host computing systems, virtual machines, and others) access storage via a volume, a virtual logical object described below in detail. A storage array is typically blind to the client systems that impact the performance of a volume. When a volume is over-impacted, it is difficult for a storage administrator to identify the source of the performance loads.

One conventional solution to the foregoing challenge is to install agents at client machines to collect information regarding traffic generated by each client. This, however, is an inefficient solution, especially in an environment that may have thousands of client machines. Maintaining compatibility of software agents with various operating systems on deployed client machines and managing the upgrade of those agents across the client machines is complicated and, hence undesirable. Continuous efforts are being made to develop computing technology that can be deployed at data centers and networked storage environments to efficiently manage and monitor infrastructure resources.

BRIEF DESCRIPTION OF THE DRAWINGS

The foregoing features and other features will now be described with reference to the drawings of the various aspects. In the drawings, the same components have the same reference numerals. The illustrated aspects are intended to illustrate, but not to limit the present disclosure. The drawings include the following Figures.

DETAILED DESCRIPTION

As a preliminary note, the terms "component", "module", "system," and the like, as used herein, are intended to refer to a computer-related entity, either software-executing general purpose processor, hardware, firmware, and a combination thereof. For example, a component may be, but is not limited to being, a process running on a processor, a processor, an object, an executable, a thread of execution, a program, and/or a computer.

By way of illustration, both an application running on a server, and the server, can be a component. One or more components may reside within a process and/or thread of execution, and a component may be localized on one computer and/or distributed between two or more computers. Also, these components can execute from various non-transitory computer readable media having various data structures stored thereon. The components may communicate via local and/or remote processes such as in accordance with a signal having one or more data packets (e.g., data from one component interacting with another component in a local system, distributed system, and/or across a network, such as the Internet, with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

In one aspect, the various aspects of the present disclosure improve computing technology for monitoring and managing complex data centers and data center resources. In one aspect, a remote acquisition unit (RAU) is provided with innovative computing components that are configured to receive mirrored network traffic at network switches that are used by client computing devices to access networked storage via a network connection. The mirrored traffic has multiple protocol layers that are parsed by RAU to determine over-impacted storage volumes, client network access addresses that send requests for the over-impacted storage volumes, and the target storage volume network access addresses that are used to access the storage devices.

The RAU provides this information to a management console that executes a storage monitoring layer, and a server monitoring layer, for monitoring storage and compute resources. The management console then uses the information from RAU, and the storage monitoring layer, and the server monitoring layer to provide useful and simplified performance data to a user so that the user can take corrective action to relieve over-impacted volumes. Details regarding the innovative computing technology are now described in detail.

Figure 1A:
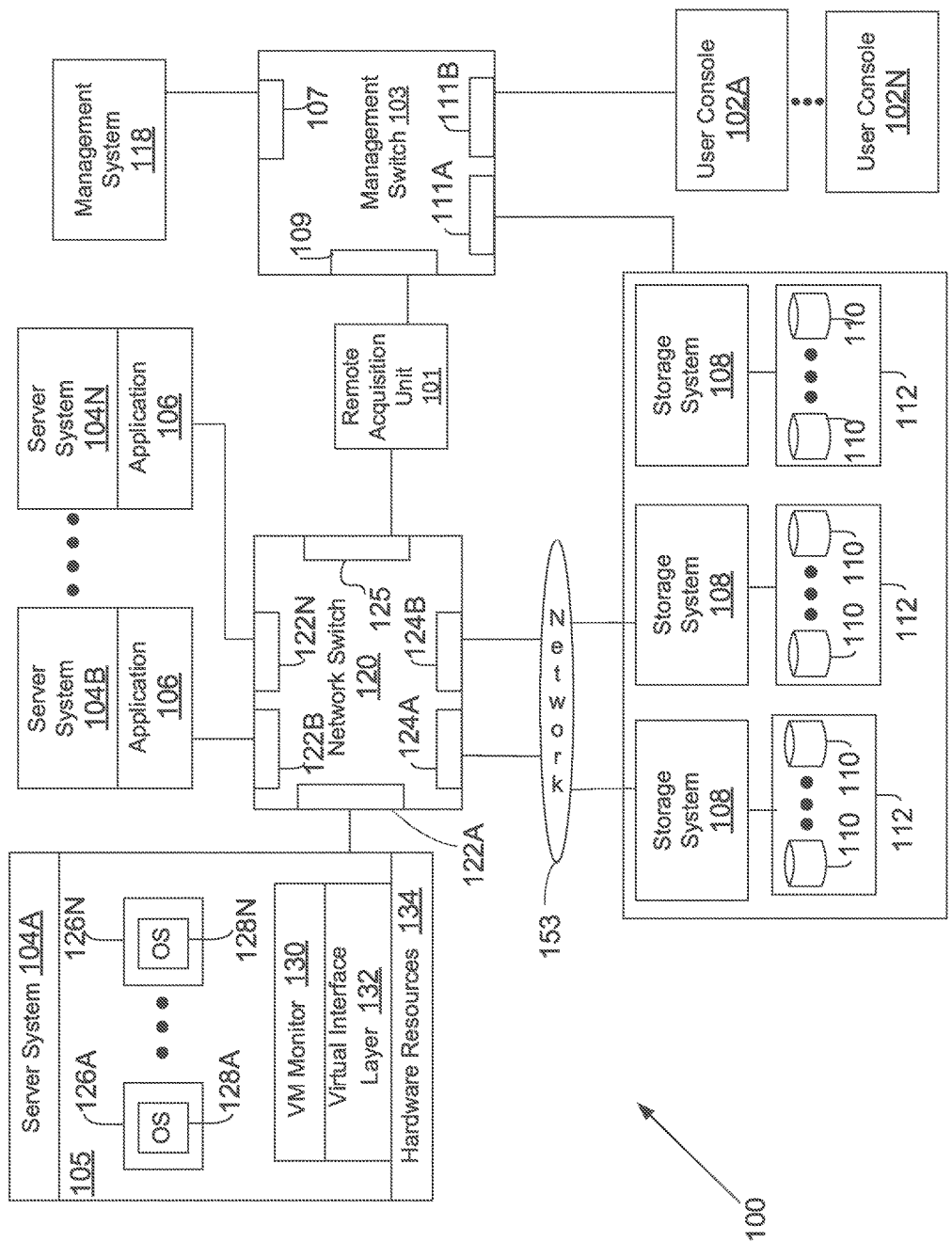
FIG. 1A shows an example of a networked storage environment for the various aspects disclosed.

System 100: FIG. 1A shows an example of a networked storage operating environment 100 (also referred to as system 100) having a plurality of resources for storing and accessing data in a networked storage system in one aspect of the present disclosure. As an example, system 100 may include a plurality of computing systems 104A-104N (may also be referred to as host system 104, server system 104, or client system/device 104) that may access one or more storage systems 108 via a network switch 120 (may also be referred to as switch 120) coupled to a network 153 such as a local area network (LAN), wide area network (WAN), the Internet, or others. As an example, network switch 120 maybe an Ethernet switch, when the hosts 104 use Ethernet to send input/output (I/O) requests to access storage devices.

In one aspect, the network switch 120 may include a plurality of ports 122A-122N, 124A-124B and a mirroring port 125, having logic and circuitry for handling network packets. For example, port 122A is coupled to host 104A, port 122B is coupled to server 104B and port 122N is coupled to server 104N. It is noteworthy that although system 100 shows only one switch 120, there may be more than one switch to access storage system 108. Ports 124A and 124B are coupled to network 153 to communicate with storage system 108 to access storage devices in a storage array described below in detail. Port 125 of switch 120 operates as a mirror port to capture network traffic for all the other ports (i.e., 122A-N and 124A-B) and transmits the mirrored traffic to RAU 101 that is described below in detail.

It is noteworthy that network switch 120 may have more or fewer ports than the number of ports shown in FIG. 1A. Furthermore, system 100 may also use storage switches (e.g. Fibre Channel switches (not shown)) to access storage area network (SAN) based storage devices.

In one aspect, RAU 101 is also connected to a management switch 103 that includes a plurality of ports 107, 109 and 111A-111B. It is noteworthy that system 100 may include more than one management switch 103 and may include more, or fewer, ports. Port 107 is coupled to a management system 118 that is described below in detail with respect to FIG. 1D, while port 109 connects RAU 101 to the management switch 103. Port 111A is connected to the storage systems 108 and port 111B is connected to one or more user consoles 102A-102N (referred to as users). Users' 102A-102N may access server system 104 for storage related services provided by storage system 108 and also use management system 118 for obtaining management related services described below in detail. It is noteworthy that the management switch 103 may also be connected to server 104 so that the management console can obtain information from server systems 104.

The term ports as used herein with respect to the management switch 103 and the network switch 120 means an entity that includes logic and circuitry (for a physical port) for receiving network packets and transmitting network packets to their destination. The logic and circuitry will depend on the protocol used by the switches, for example, Ethernet, Fibre Channel, InfiniBand and others. The examples below are described with respect to Ethernet, however, the adaptive aspects of the present disclosure are not limited to Ethernet.

Server systems 104 may be computing devices configured to execute applications 106 over a variety of operating systems, including the UNIX® and Microsoft Windows® operating systems. Applications 106 may utilize data services of storage system 108 to access, store, and manage data in a set of storage devices 110 that are described below in detail. Application 106 may include an email exchange application, a database application, or any other type of application. In another aspect, application 106 may comprise a virtual machine also described below in more detail.

Server systems 104 generally utilize file-based access protocols when accessing information (in the form of files and directories) over a network attached storage (NAS)-based network. Alternatively, server systems 104 may use block-based access protocols, for example, the Small Computer Systems Interface (SCSI) protocol encapsulated over TCP (iSCSI) and SCSI encapsulated over Fibre Channel (FCP) to access storage via a SAN.

Server 104A may also execute a virtual machine environment 105, according to one aspect. In the virtual machine environment 105 a physical resource is time-shared among a plurality of independently operating processor executable virtual machines (VMs). Each VM may function as a self-contained platform, running its own operating system (OS) and computer executable application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events and have access to hardware resources on a physical computing system (may also be referred to as a host platform) which may be referred to herein as "host hardware resources". The host hardware resource may include one or more processors, resources resident on the processors (e.g., control registers, caches, and others), memory (instructions residing in memory, e.g., descriptor tables), and other resources (e.g., input/output devices, host attached storage, network attached storage, or other like storage) that reside in a physical machine or are coupled to the host platform.

The virtual execution environment 105 executes a plurality of VMs 126A-126N. VMs 126A-126A execute a plurality of guest OS 128A-128N (may also be referred to as guest OS 128) that share hardware resources 134. As described above, hardware resources 134 may include CPU, memory, I/O devices, storage, or any other hardware resource.

A virtual machine monitor (VMM) 130, for example, a processor executed hypervisor layer provided by VMWare Inc., Hyper-V layer provided by Microsoft Corporation (without derogation of any third party trademark rights) or any other layer type, presents and manages the plurality of guest OS 128A-128N. VMM 130 may include or interface with a virtualization layer (VIL) 132 that provides one or more virtualized hardware resource 134 to each guest OS. For example, VIL 132 presents physical storage at storage devices 110 as virtual storage (for example, as a virtual hard drive (VHD)) to VMs 126A-126N. The VMs use the VHDs to store information at physical storage devices 110.

In one aspect, VMM 130 is executed by server system 104A with VMs 126A-126N. In another aspect, VMM 130 may be executed by an independent stand-alone computing system, often referred to as a hypervisor server, or VMM server, and VMs 126A-126N are presented via another computing system. It is noteworthy that various vendors provide virtualization environments, for example, VMware Inc., Microsoft Corporation (without derogation of any third party trademark rights), and others. The generic virtualization environment described above with respect to FIG. 1A may be customized depending on the virtual environment provider.

In one aspect, storage system 108 has access to a set of mass storage devices 110 (may be referred to as storage devices 110) within a storage subsystem 112. As an example, storage devices 110 may be a part of a storage array within the storage sub-system.

Storage devices 110 are used by storage system 108 for storing information. The storage devices 110 may include writable storage device media such as magnetic disks, video tape, optical, DVD, magnetic tape, non-volatile memory devices for example, self-encrypting drives, flash memory devices, and any other similar media adapted to store information. The storage devices 110 may be organized as one or more groups of Redundant Array of Independent (or Inexpensive) Disks (RAID). The aspects disclosed herein are not limited to any particular storage device or storage device configuration.

In one aspect, to facilitate access to storage devices 110, a storage operating system of storage system 108 "virtualizes" the storage space provided by storage devices 110. The storage system 108 can present or export data stored at storage devices 110 to server systems 104 and VMM 130 as a storage volume, or one, or more, qtree sub-volume units. Each storage volume may be configured to store data files (or data containers or data objects), scripts, word processing documents, executable programs, and any other type of structured or unstructured data. From the perspective of the VMs/server systems, each storage volume can appear to be a single disk drive. However, each storage volume can represent the storage space in one disk, an aggregate of some, or all, of the storage space in multiple disks, a RAID group, or any other suitable set of storage space.

It is noteworthy that the term "disk" as used herein is intended to mean any storage device/capacity and not to limit the adaptive aspects to any particular type of storage device, for example, hard disks.

The storage system 108 may be used to store and manage information at storage devices 110 based on a request generated by server system 104, management system 118, user 102 and/or a VM. The request may be based on file-based access protocols, for example, the NFS (network file system) or the CIFS (Common Internet File System) protocol, over TCP/IP (Transmission Control Protocol/Internet Protocol). Alternatively, the request may use block-based access protocols, for example, iSCSI (Internet over SCSI) or FCP (Fibre Channel Protocol). The various examples described below are based on NFS traffic but the adaptive aspects of the innovative technology are not limited to NFS or any specific protocol.

As an example, in a typical mode of operation, server system 104 (or VMs 126A-126N) transmit one or more input/output (I/O) commands, such as an NFS or CIFS request, via switch 120 to the storage system 108. Storage system 108 receives the request, issues one or more I/O commands to storage devices 110 to read or write the data on behalf of the server system 104, and issues an NFS or CIFS response containing the requested data to the respective server system 104.

In one aspect, storage system 108 may have a distributed architecture, for example, a cluster based system that may include a separate network module and storage module, described below in detail with respect to FIG. 2A. Briefly, the network module is used to communicate with host platform server system 104 and management system 118, while the storage module is used to communicate with the storage devices 110 that are a part of a storage sub-system.

Storage system 108 maintains various data structures for storing information related to storage devices 110. For example, storage system 108 is aware of the identity and capabilities of storage device 110. Storage system 108 maintains the information regarding all the VMs and server systems that use storage device 110. This information may be kept as unique identifiers.

Because storage system 108 services read and write requests, it maintains information regarding the number of I/O operations that are processed within a time unit, for example, a second, referred to herein as "IOPS" by the storage device and by each storage volume. Storage system 108 also maintains information on a rate at which information is transferred (also referred to as a throughput rate) from the storage devices. The throughput rate is maintained for each storage volume of the storage devices.

Figure 1B:
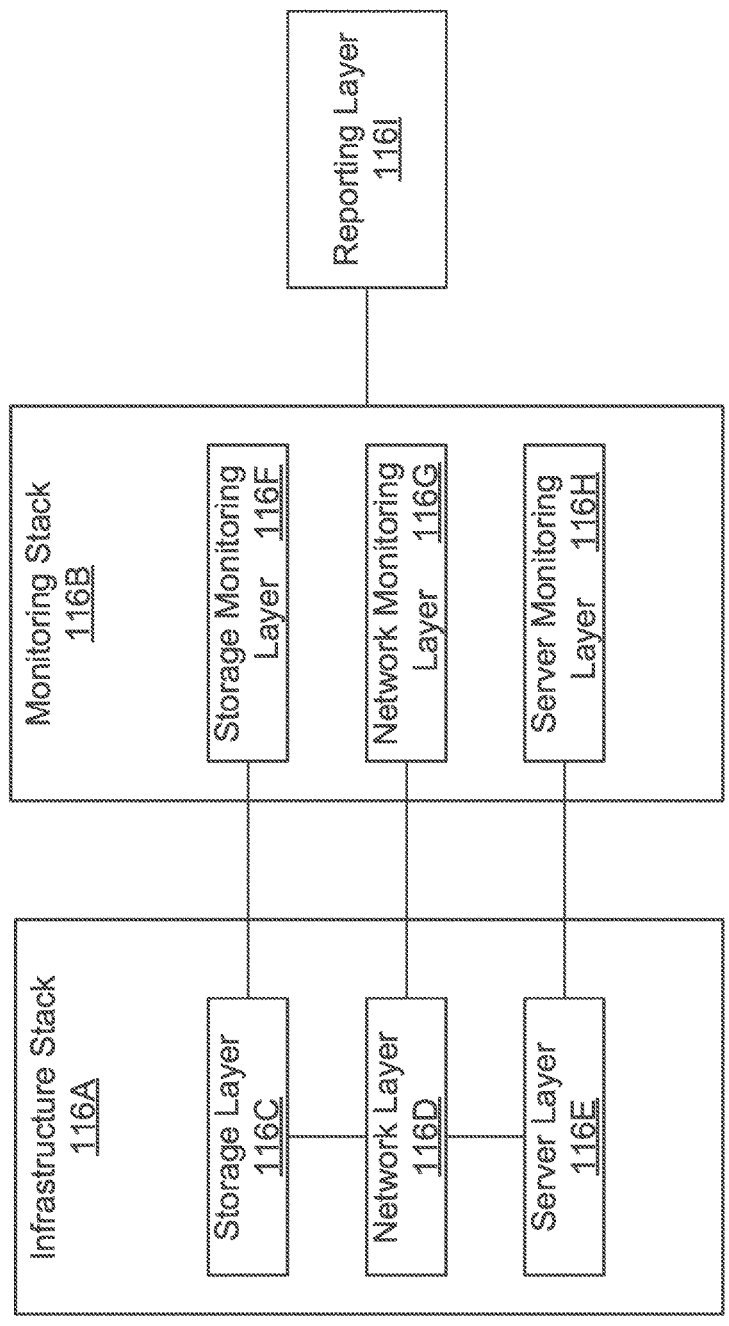
FIG. 1B shows an example of various layers for monitoring and managing resources in the networked storage environment.

Architecture 116: FIG. 1B shows a high-level architecture 116 used by the computing technology of the present disclosure to monitor and manage resources within system 100, according to one aspect of the present disclosure. Architecture 116 shows an infrastructure stack 116A that identifies various categories of resources that are used within system 100, namely a storage layer 116C, a network layer 116D, and a server layer 116E. The storage layer 116C includes storage devices, storage pools, storage volumes, and other storage entities. The network layer 116D includes network switches, network interface cards (NICs), and other network resources. The server layer 116E includes compute resources of system 100, for example, servers 104, and others.

A monitoring stack 116B is used to monitor the infrastructure components using a storage monitoring layer 116F, a network monitoring layer 116G, and a server monitoring layer 116H. RAU 101 executes the network monitoring layer 116G, while the management system 118 interfaces or executes the storage monitoring layer 116F, and the server monitoring layer 116H, described below in detail. It is noteworthy that the storage monitoring layer 116F, and the server monitoring layer 116H may be executed by more than one computing device in a distributed environment.

Based on the innovative resource monitoring and analysis, a reporting layer 116I presents information to users such that users can optimize resource usage within their operating environments and reduce bottlenecks.

Figure 1C:
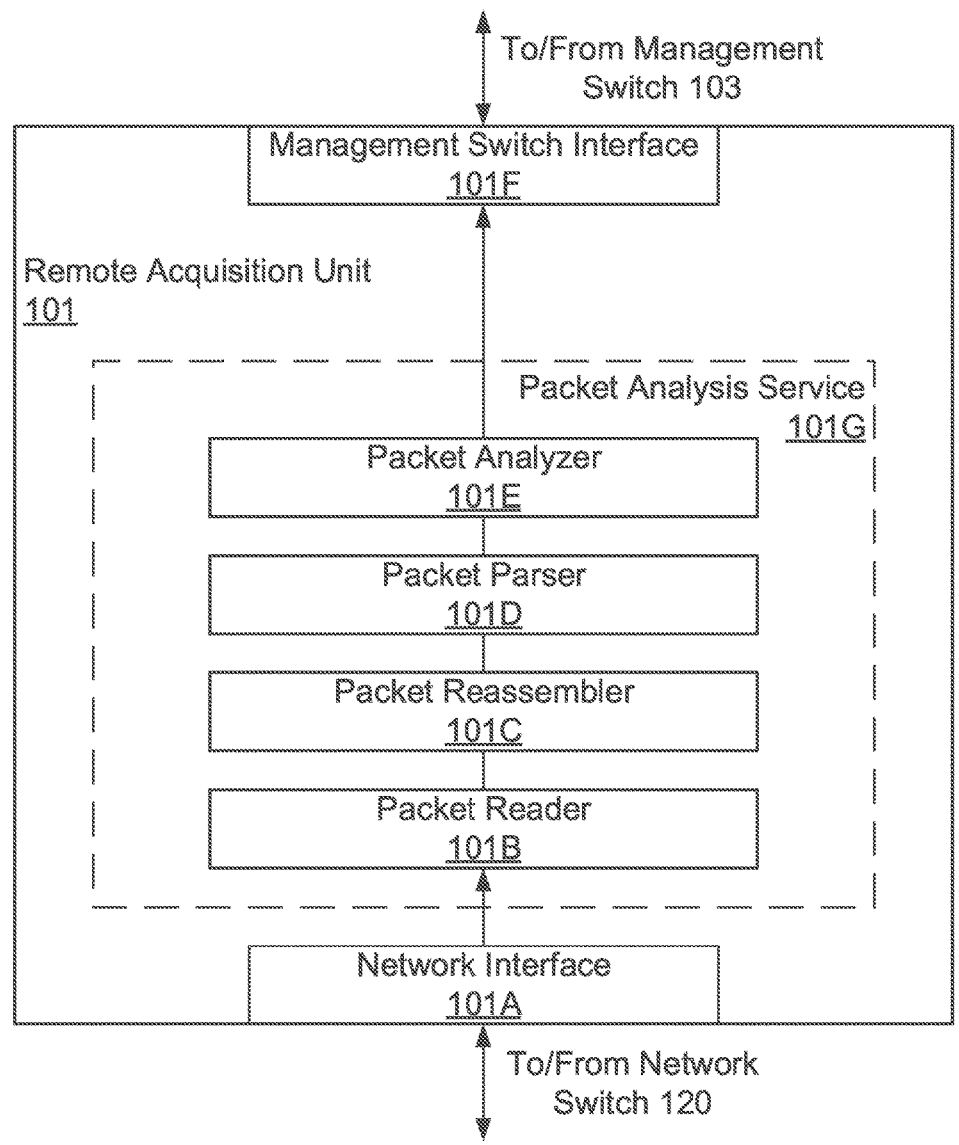
FIG. 1C shows a block diagram of a remote access unit, according to one aspect of the present disclosure.

RAU 101: FIG. 1C shows a block diagram of RAU 101, according to one aspect of the present disclosure. In one aspect, RAU 101 is a specialized computing server that is configured to receive mirrored network traffic (e.g. NFS traffic) from network switch 120 via port 125 that is configured to operate as a mirror port. The mirror port 125 mirrors all packets flowing through other switch ports that are connected to network interface cards (NICs) (or network adapters) of storage systems 108 described below in detail.

The mirrored NFS traffic is designed to provide a list of network addresses used by servers 104 (for example, client IP addresses) to communicate with the storage systems 108, target IP addresses (i.e. the IP addresses of the storage system 108, also mentioned as NFS servers), target volume identifiers (for example, master data set identifiers (MSIDs) and/or file system identifiers (FSIDs)) and operation types (for example, read or write operation). The mirrored NFS traffic is received by a network interface 101A at RAU 101 and buffered at a storage location (not shown) of the network interface 101A. The mirrored NFS traffic is then pre-processed/analyzed by a packet analysis service (PAS) 101G. PAS 101G may be implemented using hardware components, software components, or a combination thereof.

In one aspect, PAS 101G includes a packet reader 101B, a packet re-assembler 101C, a packet parser 101D and a packet analyzer 101E described below in detail. It is noteworthy that the term packet as used herein is intended to include one or more protocol data units (PDUs) and that multiple network level packets may be necessarily combined to form a single higher level PDU. It is also noteworthy that although, for clarity, these various components of PAS 101G are shown separately, they may be consolidated into a single module executed by hardware customized for executing the process blocks described below.

In one aspect, the NFS traffic includes multiple layers/packets, for example, an Ethernet header, a TCP header and IP header. The NFS PDUs themselves are encapsulated in remote procedure call (RPC) PDUs that are embedded in transport layer packets (for example, TCP packets) and hence can span multiple frames. Furthermore, TCP traffic may include many RPC PDUs with a plurality of NFS operations as NFS PDUs. RPC is a standard protocol that one program can use to request a service from a program located in another computer.

The mirrored NFS traffic is first read by the packet reader 101B from the network interface 101A and then provided to a packet re-assembler 101C that maybe a TCP re-assembler. In one aspect, the packet reader 101B may include or use an application programming interface (API) to retrieve data directly from NIC 101A buffers (not shown) without having to go through an operating system stack (for example, a Linux kernel stack, when RAU 101 uses Linux as an operating system). This is efficient because OS resources are not used. The adaptive aspects described herein are not limited to using the API by the packet reader 101B.

The packet re-assembler 101C assembles the various TCP packets in the mirrored traffic. The packet parser 101D inspects the TCP packet stream and identifies the embedded RPC PDUs. The packet parser 101D then locates the NFS PDUs from the RPC PDUs. The packet parser 101D evaluates the data in the NFS PDU and provides that information to the packet analyzer 101E.

In one aspect, the NFS protocol does not include a volume name in each NFS PDU and instead provides a file handle in the NFS PDU. The file handle encodes the destination volume/file location for a NFS operation. The packet parser 101D evaluates the file handle and obtains the encoded identifier for an NFS volume. The packet parser 101D provides these volume identifiers to packet analyzer 101E with information regarding operation type. As described below, these identifiers are then used by the management system 118 to translate the NFS volume identifiers to corresponding NFS volume names that are used by each NFS server (i.e., storage system 108).

The packet parser 101D also obtains the client server IP address (i.e., the source IP address), and the storage system IP address, from the IP header in the mirrored traffic stream. This information is also provided to the packet analyzer 101E.

In one aspect, the packet analyzer 101E tracks NFS operations requested by clients (identified by IP addresses) to NFS servers (i.e., storage systems 108 IP addresses) along with NFS volume identifiers. The packet analyzer 101E determines a subset of NFS volumes that handle the highest (or greatest) number of NFS operations (i.e., read and write operations). The packet analyzer 101E also creates a subset of client identifiers (IP addresses) that is ranked by their count of observed operations. In one aspect, the packet analyzer 101E uses a probabilistic sketch count to keep track of the operations, instead of using individual counters for each NFS volume and client. This is less resource intensive and hence more efficient.

The packet analyzer 101E provides a total number of NFS operations that are observed for a certain duration, a list of most heavily targeted storage system IP addresses, volume identifiers sorted by the observed NFS operations and a sub-list of NFS clients for each "hot" volume sorted by the observed NFS operations.

The packet analyzer 101E provides periodic reports to the management system 118 via the management switch 103. It is noteworthy that traffic to the same storage volume may appear in multiple reports from the RAU 101, traffic from one compute resource may also appear in multiple reports to the same or different storage volumes. Details of management system 118 are provided below.

Figure 1D:
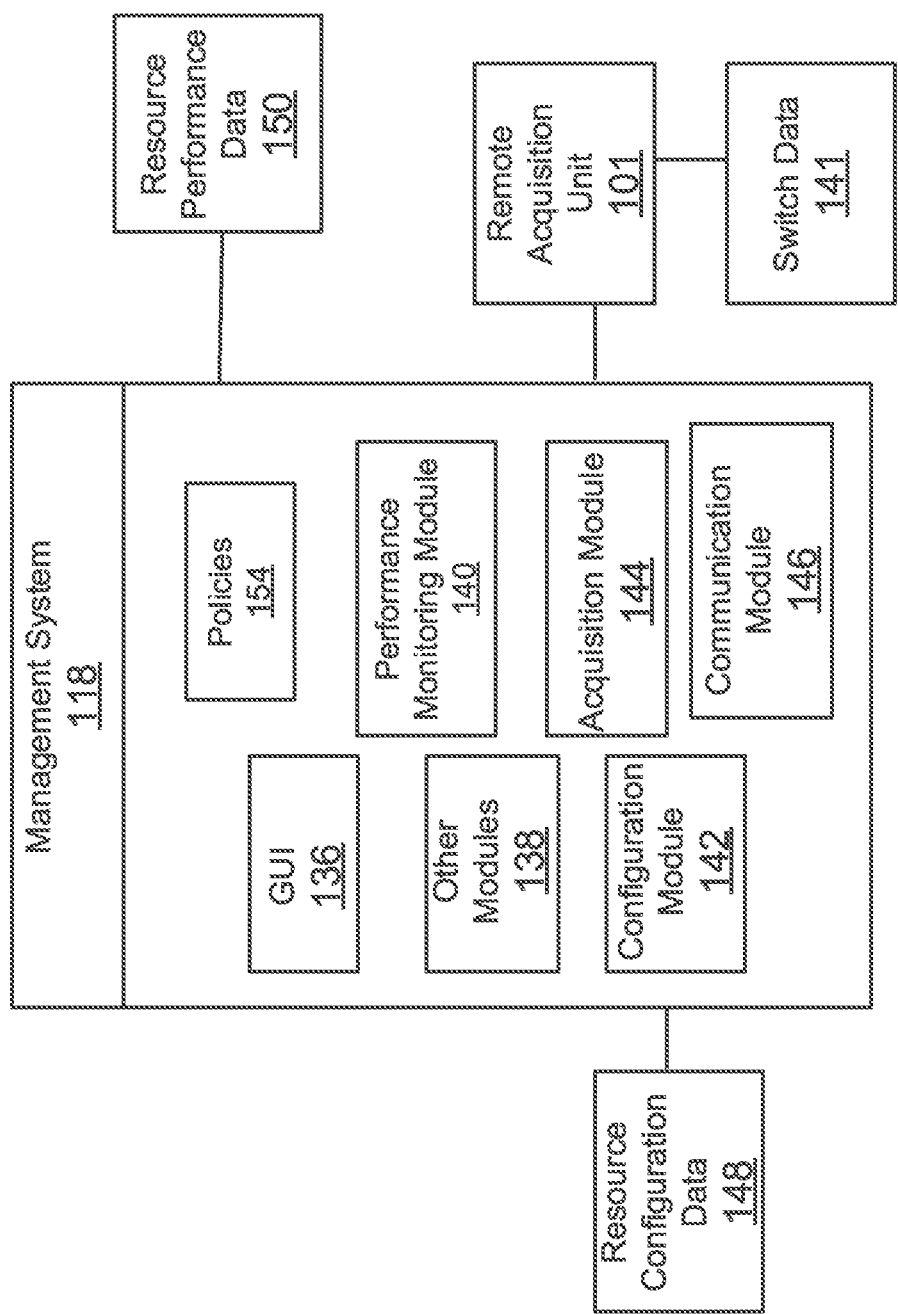
FIG. 1D shows an example of a management system, according to one aspect of the present disclosure.

Management System 118: FIG. 1D shows a block diagram of management system 118 having a plurality of modules, according to one aspect. It is noteworthy that the various modules of the management system 118 may be implemented in one computing system at a management server/console or in a distributed environment among multiple computing systems.

In one aspect, the management system 118 receives data/reports from RAU 101 via the management switch 103, as described above. The management system 118 evaluates the list of top volumes and clients and maps the volumes and clients to resources that are identified by the management system 118 executing the storage monitoring layer 116F and the server monitoring layer 116H, as described below in detail. For example, the management system 118 uses compute resource IP addresses (e.g., IP addresses used by servers 104) to identify compute resources, storage IP addresses (i.e., target IP addresses) to identify the storage system 108 and internal volume identifiers that identify volumes managed by the storage system 108. Once these entities are identified, the management system 118 creates a performance path object (may be referred to as a NAS performance path object (e.g., 199, FIG. 1H)) that maps a server to an internal volume with associated performance counters to track the performance metrics of the internal volume as described below in detail. Thereafter, the results of the analysis performed by the management system 118 are displayed in a user interface on a display device.

In one aspect, the management system 118 includes a graphical user interface (GUI) module 136 to generate a GUI for use by a storage administrator or a user using a user console 102. In another aspect, management system 118 may present a command line interface (CLI) to a user.

Management system 118 may also include a communication module 146 that implements one or more communication protocols (Ethernet, Fibre Channel, InfiniBand and others) and/or APIs to enable the various modules of management system 118 to communicate with the RAU 101, management switch 103, storage system 108, VMs 126A-126N, server system 104, and clients 102.

In one aspect, management system 118 also includes an acquisition module 144 that obtains information regarding storage devices 110 from storage system 108 and other resources of system 100 as part of implementing the storage monitoring layer 116F. Acquisition module 144 also obtains information regarding servers 104, as described below as part of implementing the server monitoring layer 116H.

Acquisition module 144 may send a discovery request to obtain configuration and performance information. The format and structure of the discovery request depends on the protocol/standard used by the acquisition module 144 to communicate with the storage system 108. The information may include an amount of data that is transferred to and from a storage device within a certain duration, a number of IOPS that are serviced by a storage device, the identity of the server systems (also referred to as host systems) that use the storage devices, utilization of the storage devices, storage nodes, cache utilization of the storage nodes, cache hit ratio of the storage nodes, and other information, jointly referred to as performance metrics.

Management system 118 also includes a processor executable configuration module 142 that stores configuration information for various resources used by system 100, for example, storage system nodes, storage devices, storage switches, and other resources. The configuration information may be stored as a data structure 148, shown as resource configuration data 148 and may be referred to as configuration data structure 148 or simply as data structure 148. In one aspect, the management system 118 also maintains information regarding storage device 110 at the resource configuration data structure 148 to store a name of a storage device manufacturer, a storage device identifier, a maximum number of IOPS that the device can handle, and a throughput rate that the storage device is able to support.

Resource configuration data 148 also identifies the storage system 108 that manages a storage device, the storage volumes associated with the storage device, and the identity of users (for example, server systems 104) that access the storage volumes. This information may be obtained from storage system 108.

Resource configuration data 148, may also identify the switch 120 used by system 100, the various ports of switch 120 and the identity of the devices/computing systems that are coupled to the switch 120.

Resource configuration data 148 may further identify the VMM 130, for example, the hypervisor that presents and controls VMs 126A-126N; the various VMs and the resources that are used by the VMs at any given time, for example, VHDs. This information may also be acquired by acquisition module 144 from VMM 130 and storage system 108.

Management system 118 includes a performance monitoring module (may be referred to as performance module) 140 that receives performance data regarding various resources of system 100. The performance data may be collected based on stored policies 154. The resource performance data may be stored at a data structure 150. The performance data 150 shows if a storage device is over utilized at a given time, the number of IOPS within certain duration, a throughput within the certain duration, available capacity at any given time and other information. Performance data 150 may also include information regarding the performance of Node CPUs and any other configured resource. Performance data 150 may also include information regarding the various VMs, identity of the virtual disks used by the VMs, and other information that is described below in more detail. It is noteworthy that performance data 150 may be stored as part of the storage monitoring layer 116E and the server monitoring layer 116H.

Management system 118 may also include other modules 138. The other modules 138 are not described in detail because the details are not germane to the inventive aspects.

Figure 1E:
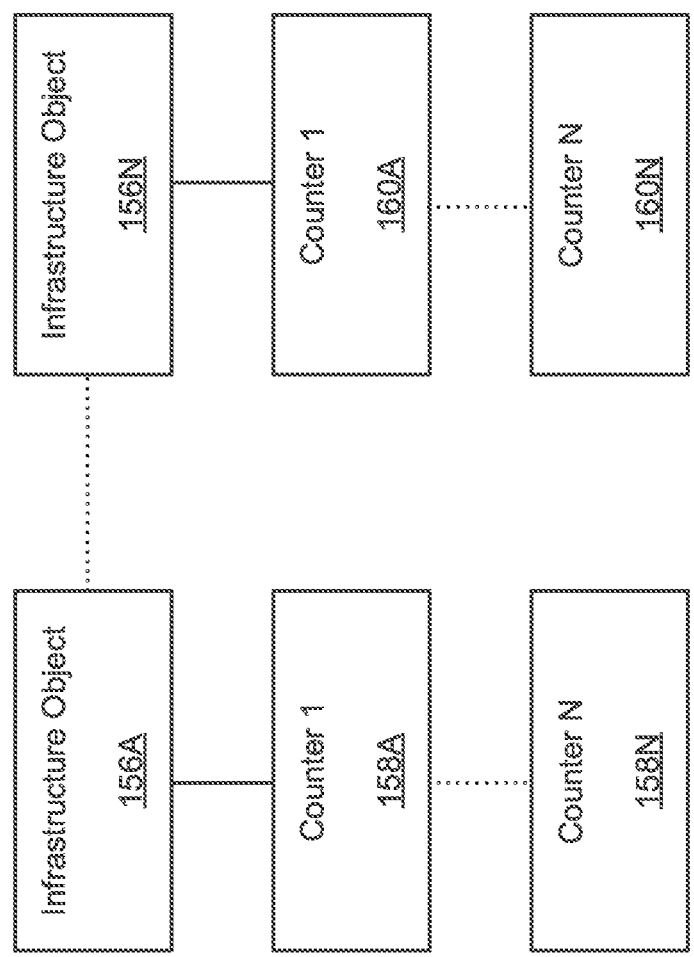
FIG. 1E shows an example of a plurality of infrastructure objects that are monitored by the management system of FIG. 1D, according to one aspect of the present disclosure.

FIG. 1E shows an example of how performance data is maintained and collected for various resources in executing the storage monitoring layer 116E, according to one aspect. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, performance data may include a number of visits, wait time per visit and service time per visit. For the delay center, only the number of visits and the wait time per visit at the delay center.

In one aspect, a flow type i.e. a logical view of the resources is used for handling client requests. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

Referring now to FIG. 1E, the various resources of system 100 maybe represented logically as infrastructure objects 156A-156N (may also be referred to as resource objects 156 or objects 156). Data associated with the resources is collected using various counters shown as 158A-158N and 160A-160N and then stored at performance data structure 150 (FIG. 1D).

Figure 1F:
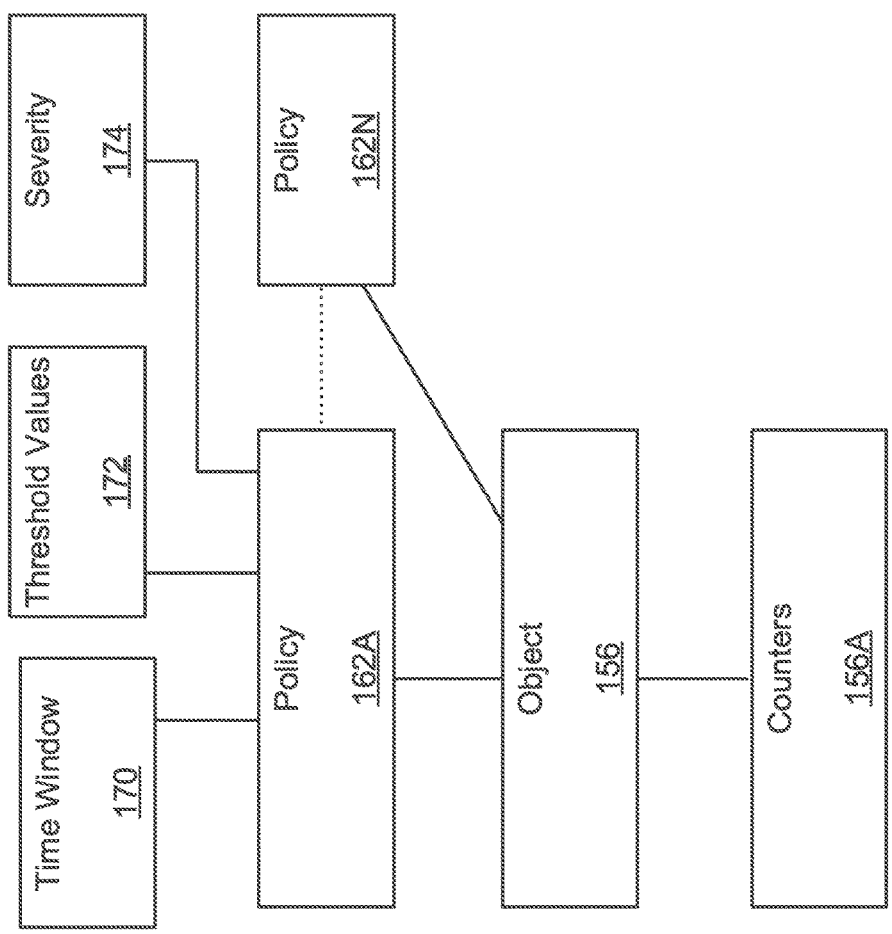
FIG. 1F shows a format for managing performance data in a networked storage environment, according to one aspect of the present disclosure.

FIG. 1F shows an example of how a policy may be associated with an infrastructure object 156 for collecting performance data, according to one aspect of the present disclosure. Infrastructure object 156 may be associated with one or more policies 162A-162N and a time window 170. Threshold values 172 are assigned to certain parameters for generating alerts and severity 174 defines the importance of an alert, for example, an alert may be critical, or it may only be a warning. Based on the policy, counters 156A are used to collect the appropriate data for the time window 170.

Figure 1G:
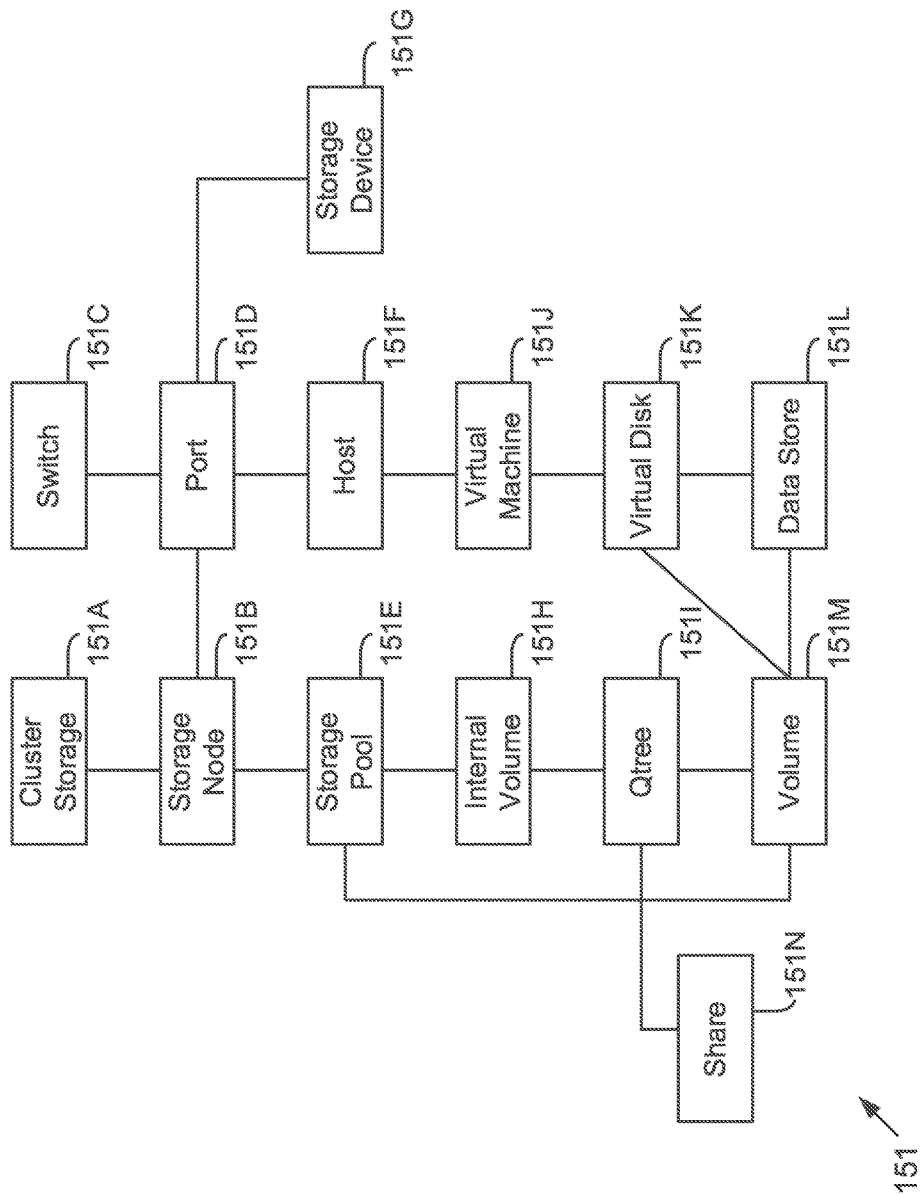
FIG. 1G shows an example of a hierarchy of resource objects monitored according to one aspect of the present disclosure.

Object Hierarchy: FIG. 1G shows an example of a format 151 for tracking information/relationships regarding different resources that are used within storage system 100 and a clustered storage system shown in FIG. 2A and described below in detail. The format 151 is used for implementing the storage monitoring layer 116E, according to one aspect of the present disclosure. Each resource is represented as an object and is identified by a unique identifier value (object ID). One or more counters collect performance data associated with the resource, described above in detail.

Format 151 maybe a hierarchical mesh where various objects may have parent-child, peer, and remote peer relationships, as described below. As an example, format 151 shows a cluster object 151A that may be categorized as a root object type for tracking storage cluster (202, FIG. 2A) level resources. The cluster object 151A is associated with various child objects, for example, a storage node object 152B that identifies a storage node within the cluster. The cluster object 151A stores information regarding the cluster, for example, the number of nodes it may have, information identifying the nodes, and any other information.

The storage node object 151B stores information regarding a node, for example, a node identifier and performance data regarding the nodes, for example, CPU utilization of the nodes, latency (i.e., delay) in processing I/O requests, the number of storage volumes the node is managing, cache utilization, cache hit ratio, and other information.

Each cluster node object 151B may be associated with other objects for example, a storage pool 151E and a port object 151D that is a child of a switch object 151C representing a storage switch (not shown) to access storage devices 110. The port object 151D is also associated with a storage device object 151G denoting that the port provides access to the storage device.

The storage pool 151E object stores an identifier for identifying a storage pool that may have one or more aggregates associated with one or more storage devices. The storage pool object 151E stores information regarding storage utilization, latency in responding to I/O requests and other information by one or more storage pools.

The storage pool 151E is associated with an internal volume object 151H that is managed by the storage operating system. The internal volume is associated with a qtree object 151I that in turn is associated with a volume (for example, a LUN) 151M that is presented to a host system or a share (for example, a CIFS share) 151N. The volume 151M may be associated with a data store 151L.

A host system object 151F is used to store information regarding a host and a virtual machine 151J tracks performance/configuration information regarding a virtual machine. The virtual disk object 151K is used to track information regarding a virtual disk. The virtual disk object 151K is also associated with the data store object 151L.

The various objects of FIG. 1G are shown as an example. Other object types may be added based on an operating environment. The performance data and the configuration data including the relationship information between the resources is stored at a storage device, as described below in detail.

Figure 1H:
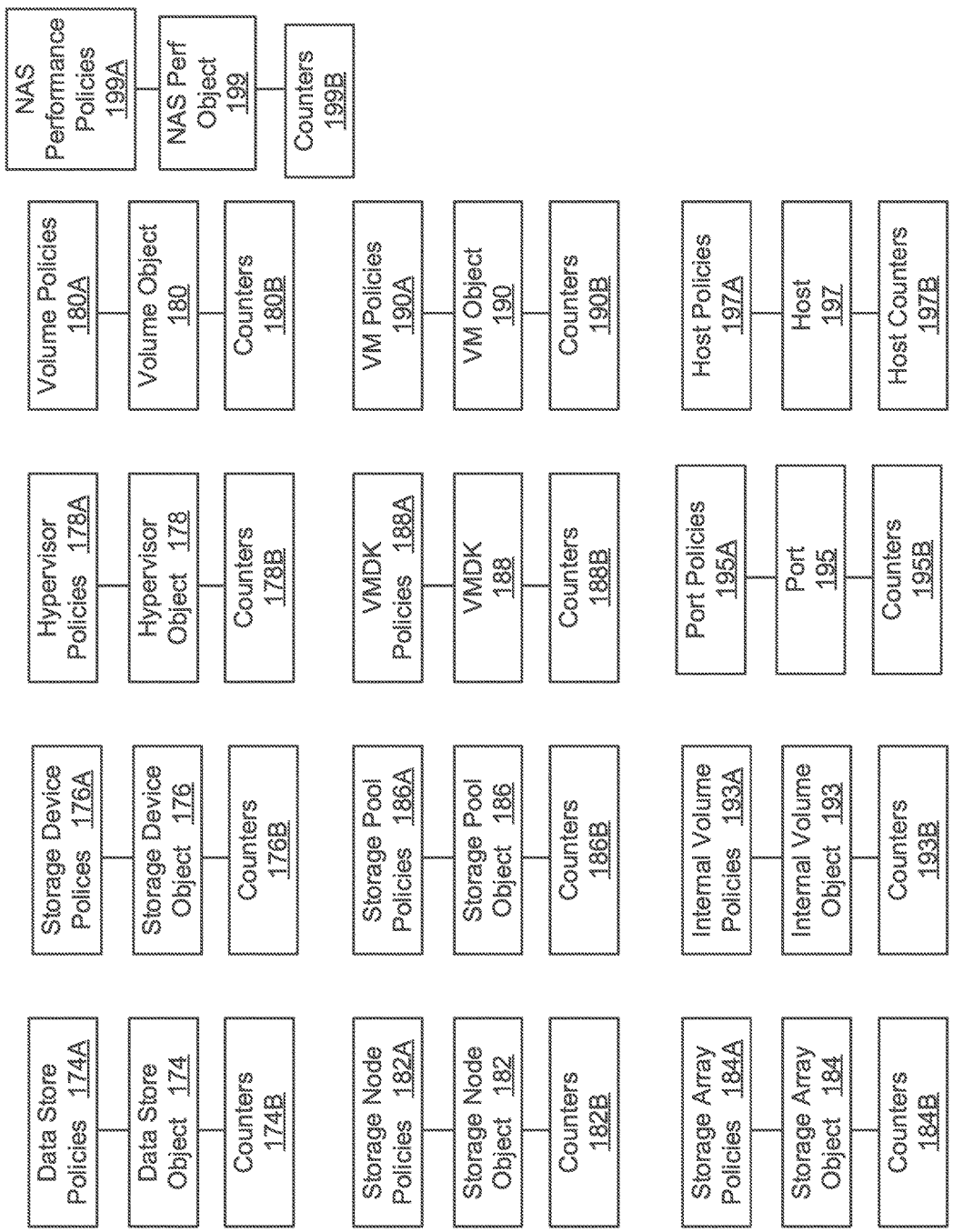
FIG. 1H shows an example of different counters that may be used to collect resource performance data for different resource types, according to one aspect of the present disclosure.

FIG. 1H shows an example of various objects for both the storage monitoring layer 116F and the server monitoring layer 116H, according to one aspect of the present disclosure. For example, the infrastructure objects include a data store object 174 with associated data store policies 174A and counters 174B. The data store object 174 is used to track a plurality of virtual disks (VMDKs) that may be used within a VM for storing information.

The infrastructure objects include a storage device object 176 with storage device policies 176A and counters 176B. The storage device object 176 is used for tracking attributes of different storage devices using counters 176B.

A hypervisor (or VMM) object 178 with policies 178A and counters 178B is used for tracking attributes of the hypervisor using counters 178B. A volume object 180 with policies 180A and counters 180B is used for tracking attributes of a volume using counters 180B. The volume object 180 represents a volume that is presented to a host system for storing data.

A storage node object 182 with policies 182A and counters 182B is used for tracking attributes of a storage node using counters 182B, for example node CPU utilization, cache hit ratio, cache utilization, available capacity of a storage node for handling a new workload, and other attributes.

A storage array object 184 with policies 184A and counters 184B is used for tracking attributes of a storage array using counters 184B including used capacity at any given time, available capacity, and other attributes.

A storage pool object 186A with policies 186A and counters 186B is used for tracking attributes of a storage pool (for example, an aggregate having a plurality of storage devices) using counters 186B.

A virtual machine (or VM) object 190 with policies 190A and counters 190B is used for tracking attributes of a VM using counters 190B. A virtual disk object (VMDK) 188 with policies 188A and counters 188B is used for tracking attributes of a VMDK using counters 188B.

An internal volume object 193 with policies 193A and counters 193B is used for tracking attributes of an internal volume using counters 193B. An internal volume is a logical representation of storage as maintained by a storage operating system, described below in detail.

A port object 195 with associated policies 195A and counters 195B is used to track port attributes.

A host system object 197 with associated policies 197A and counters 197B is used to represent host computing systems, for example, 104.

A NAS performance object 199 is used to track performance of a host associated with an internal volume using policies 199A. Performance counters 199B track the total number of operations for the internal volume from the specific host based on data from RAU 101. Details of using the NAS performance object 199 are provided below.

Table I below shows an example of various counters/metrics associated with various objects (for example, Storage (e.g., 176, FIG. 1H), Storage Node (e.g., 182, FIG. 1H), and Storage Pool (e.g., 186, FIG. 1H)) of FIG. 1H that are maintained by the management system 118 to implement the storage monitoring layer 116H, according to one aspect of the present disclosure. The column labelled "Object" identifies an infrastructure object that is monitored and tracked. The second column shows the "Counter" (or metric) associated with the infrastructure object. The third column shows the unit associated with the performance metric. For example, the unit MBps (or MBS) means, megabytes per second, IOPS means number of I/Os (i.e., read and/or write) operations per second, and the other units are self-explanatory. The fourth column provides a description of the performance data that is being collected for an object/counter.

Briefly, the "Storage" object of Table I is the storage device where data will be stored for a new workload, the object "Storage Node" is a compute node for an array/cluster that manages data flow to storage devices and the object "Storage Pool" is a logical pool of storage devices in a storage array that comprises of various storage nodes and storage devices. The term port in Table I below may include an inter-connect switch port i.e., a storage switch port (different from the network switch 120 ports) that routes traffic between storage nodes as well as the adapter ports used by the storage nodes. It is noteworthy that Table I is only an example, other objects of FIG. 1F are also tracked and can be used for implementing the adaptive aspects of the present disclosure.

TABLE I

| Object | Counter(s)/Metrics | Unit | Description |
|---|---|---|---|
| Storage | Average Throughput | MBps | Average amount of data read or written to the object in megabytes per second in a sampling period |
| Storage | Total Operations | Operation Count | Total number of operations observed in a sampling period |
| Storage Node | Average Throughput | MBps | Average amount of data read or written to the object in megabytes per second in a sampling period |
| Storage Node | Total Operations | Operation Count | Total number of operations observed in a sampling period |
| Storage Node | Resource Utilization | Percentage | Utilization of, for example, storage capacity, CPU, memory or others in a sampling period |
| Storage Node | Total Port Errors | None | The number of port errors in the array |
| Storage Pool | Capacity Utilization | Percentage | Storage device capacity utilization for the object in a sampling period |
| Storage Pool | Total Operations | Operation Count | Total number of operations observed in a sampling period |
| Storage Pool | Average Throughput | MBps | Average amount of data read or written to the object in megabytes per second in a sampling period |

Figure 1I:
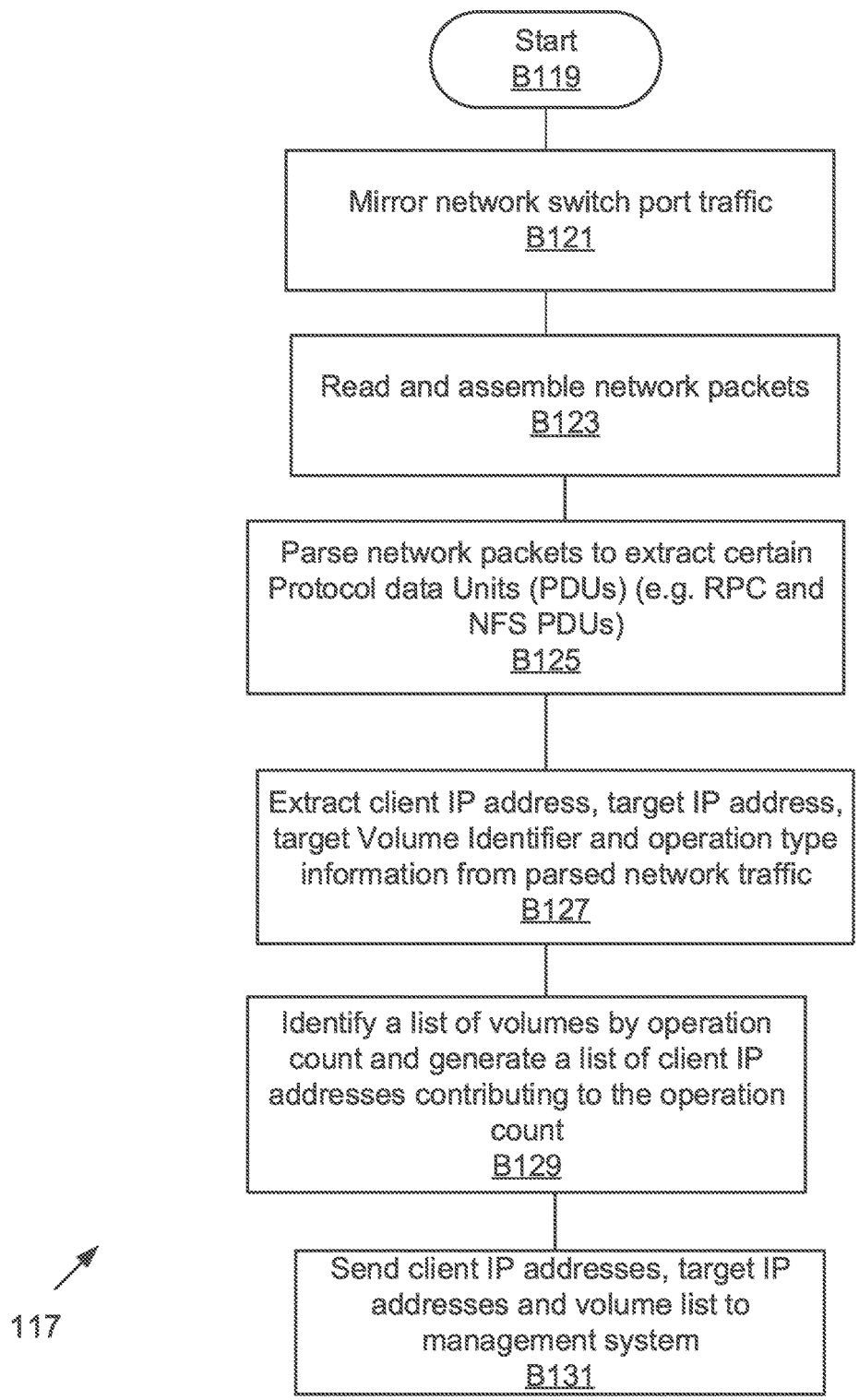
FIG. 1I shows a process for evaluating network traffic by the remote acquisition unit, according to one aspect of the present disclosure.

Process Flow: FIG. 1I shows a process 117 for mirroring network switch traffic (e.g., NFS traffic), according to one aspect of the present disclosure. The process begins in block B119, when server systems 104, management system 118, RAU 101 and storage system 108 are initialized and operational. Application 106 at different servers or different instances of application 106 send read/write requests for reading and writing data to and from the storage devices 110. Switch 120 is configured to mirror all the switch traffic using port 125 to RAU 101. It is noteworthy that more than one port can be used to mirror the network switch traffic and more than one network switch may have its mirror ports monitored by one (or more) RAU instances.

In block B121, at any given time, all incoming network traffic to ports 122A-122N is mirrored by port 125 and sent to RAU 101 as network packets. In one aspect, as an example, where NFS is used to send I/O requests, all NFS network traffic is mirrored. As an example, the NFS network traffic may include the following fields: A network protocol layer version number (e.g., Internet Protocol version 4), a source network address (e.g., client or server 104 IP address), and a destination network address (e.g., a target storage system IP address). A transport layer indicator (for example, TCP), a source TCP port number, a destination TCP port number, a sequence number for the TCP packet, and a length of the TCP packet. An RPC PDU with indicator indicating a RPC type, an RPC version (e.g., 2) program name (e.g., NFS), a program version (e.g., NFS version) a transaction identifier (XID) and a procedure type (e.g., access). An NFS PDU that includes a program version, operation type, an object length, and a file handle. The network traffic is provided to the network interface 101A and temporarily stored at one or more memory buffers (not shown).

In block B123, the packet reader 101B reads the network packets from network interface 101A. The network packets are provided to the packet re-assembler 101C that assembles the TCP segments included in Ethernet frames.

In block B125, the packet parser 101D extracts the RPC PDUs that are embedded in the reassembled TCP stream. The NFS PDUs are then extracted from the RPC PDUs.

In block B127, the packet parser 101D examines the NFS PDU to extract the operation type information, and the encoded destination volume identifier and file location. The client IP address and target IP address are also obtained from the IP header. This information is then provided to the packet analyzer 101E.

In block B129, the packet analyzer 101E identifies a list of volumes that are targets for the greatest number of operations. The packet analyzer 101E also identifies a list of client IP addresses that contribute the most to the number of operations for the target volumes. The information (i.e. total number of operations, list of over-impacted volumes (or hot volumes), client IP addresses and target storage system IP addresses) is formatted and in block B131, the information is sent to the management system 118 via the management switch interface 101F.

Figure 1J:
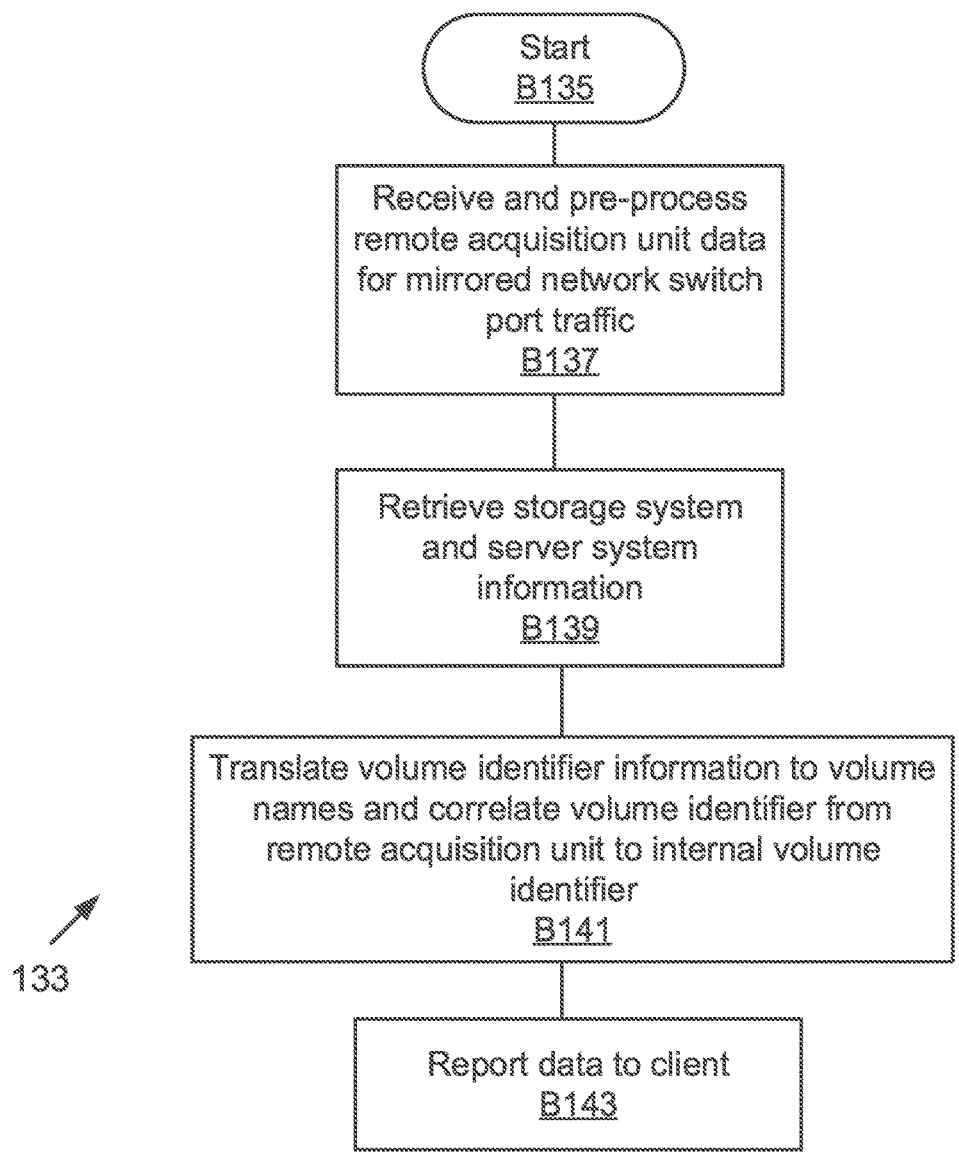
FIG. 1J shows a process for using network traffic for managing resources of the networked storage environment, according to one aspect of the present disclosure.

FIG. 1J shows a process 133 executed by the innovative computing technology of management system 118, according to one aspect of the present disclosure. The process begins in block B135, when the RAU 101 has provided the total number of I/O operations (or NFS operations) that have been executed within a certain time frame, a list of volumes that have witnessed the greatest number of volumes (i.e., hot volumes) with a list of target storage system IP addresses and a list of client IP addresses that have contributed to the list of over-impacted volumes. The management system 118 has also obtained storage performance and configuration data by executing the storage monitoring layer 116F as well as host system/VM data by executing the server monitoring layer 116H.

In block B137, the management system 118 pre-processes the data received from RAU 101. In one aspect, the management system loads raw sample data from RAU 101 into a memory of the management system 118. The management system 118 scans each report from RAU 101 and merges the report to account for target storage system IP addresses, volumes and client IP addresses that appear in multiple reports received from RAU 101.

In block B139, the management system 118 retrieves storage resource and server data corresponding to the target storage system IP addresses, client IP addresses and the storage volume identifiers.

In block B141, the volume identifiers from RAU 101 are translated to internal volume identifiers used by the storage system 108. The management system 118 also generates an object (NAS performance object 199, FIG. 1H) that describes a relationship between a host system and internal volume with associated performance metrics (e.g., total number of operations), described above.

Based on the translation, the management system 118 reports the data to a client. In one aspect, GUI 136 (FIG. 1D) presents an interface for each host system and VM. The GUI displays the internal volumes and storage associated with the host/VM with the "observed IOPS" for a time range. The result may be displayed in a table or as an inline, stacked graph. The GUI 136 may also present a landing page for each internal volume with the host/VMs that are active for the internal volume. The interface also provides observed IOPS for the internal volume at the internal volume landing page.

The presented data enables a user to optimize the use of storage resources by load balancing, adding more storage, adding more volumes, and other corrective action.

It is noteworthy that although the examples above are described with respect to NFS, the innovative computing technology described herein can be used with CIFS, SMB, iSCSI, and other protocols.

In one aspect, methods and systems for networked storage systems are provided. One method includes receiving a plurality of requests from a plurality of client systems at a plurality of ports of a network switch (120, FIG. 1A) for reading and writing data in a networked storage system where a plurality of storage devices are accessed by the plurality of client systems via the plurality of ports of the network switch. Each request includes a transport layer packet (e.g., TCP), a source network access address (e.g., IP address) used by each client system to send each request, a target network access address (e.g., IP address) for a storage system managing one or more storage devices, an application layer protocol data unit (e.g., a RPC PDU) that encapsulates a file system request (e.g., a NFS PDU) with encoded information for a storage volume and an indicator indicating an operation type for each request.

The method further includes mirroring the plurality of requests and transmitting the mirrored plurality of requests by a dedicated mirror port of the network switch to a remote acquisition unit; assembling by the remote acquisition unit transport layer packets from the mirrored plurality of requests; extracting by the remote acquisition unit application layer protocol data units from the assembled transport layer packets; parsing by the remote acquisition unit of the application layer protocol data units to obtain file system requests; identifying by the remote acquisition unit storage volume identifiers from the parsed file system requests that are associated with a greatest number of operations; identifying network access addresses for client systems initiating the greatest number of operations for the storage volumes and network access addresses of target storage systems managing the storage volumes; and providing a total number of operations for the plurality of requests in a given time, the identified storage volume identifiers, the network access addresses of the client systems and the network access addresses of the target storage systems to a management console.

The technology disclosed herein improves computing techniques that are used in data centers and networked storage environments. Individual agents at host systems are not required, instead, mirrored network traffic is used to highlight volume-level performance with respect to the host systems that use the volumes. This enables a storage administrator to more efficiently use storage devices and other resources of the network storage environment.

Clustered Storage System: FIG. 2A depicts an illustrative aspect of a networked storage environment 200 with RAU 101 and management system 118, described above in detail. The networked storage environment includes a plurality of server systems 204.1-204.2 (similar to server systems 104 described above), RAU 101, network switch 120, a clustered storage system 202 (similar to storage system 108) and at least one computer network 206 communicably connecting the server systems 204.1-204.2 and the clustered storage system 202. RAU 101 provides mirrored network switch 120 traffic to the management system 120. The management system 118 retrieves and analyzes information from various cluster nodes as described above in detail. In particular, storage performance data 150 and configuration data 148 may be obtained from the various cluster nodes.

Figure 2A:
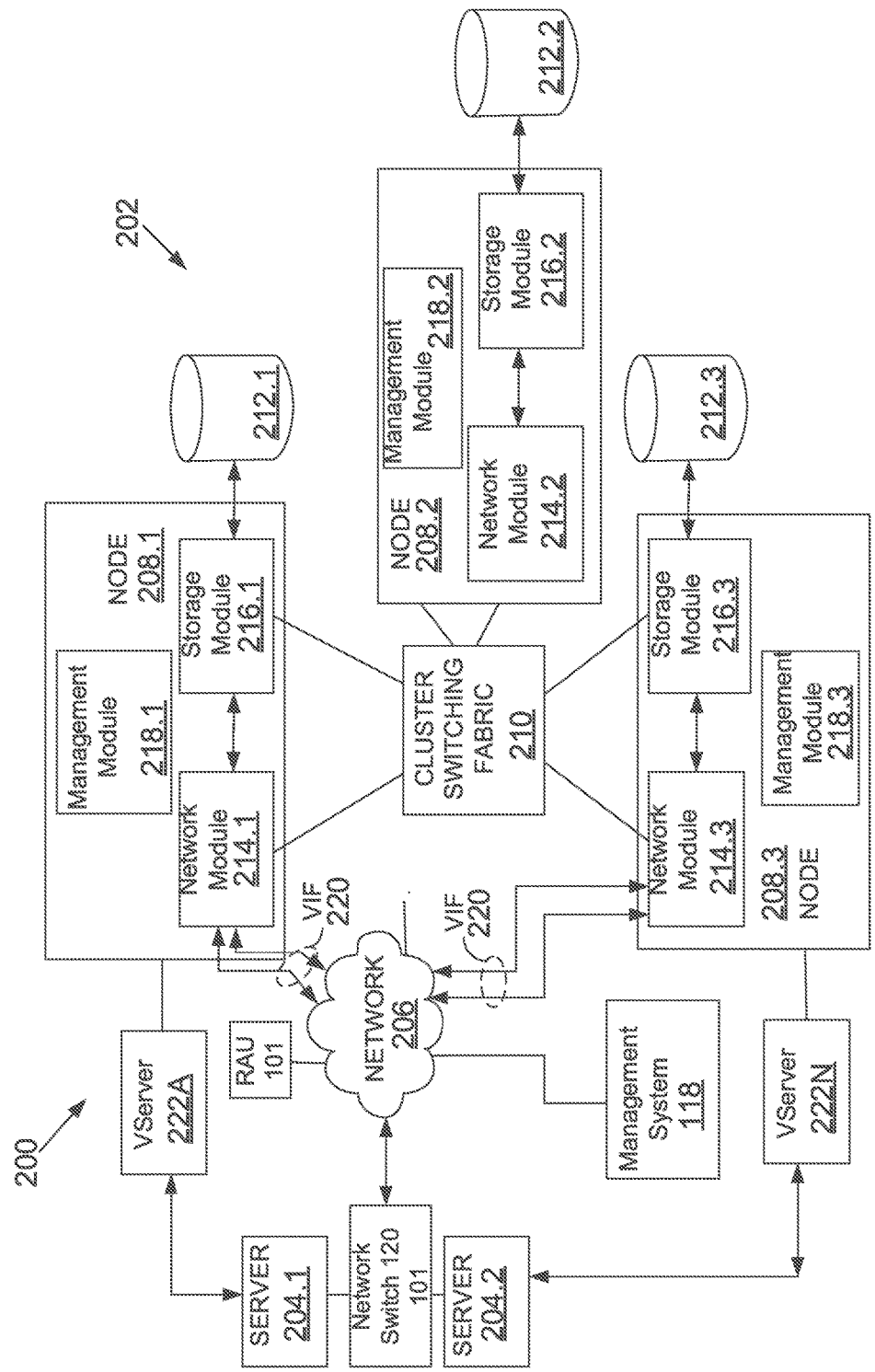
FIG. 2A shows an example of a clustered storage system, according to one aspect of the present disclosure.

As shown in FIG. 2A, the clustered storage system 202 includes a plurality of nodes 208.1-208.3, a cluster switching fabric 210, and a plurality of mass storage devices 212.1-212.3 (similar to 110, FIG. 1A).

Each of the plurality of nodes 208.1-208.3 are configured to include a network module, a storage module (for example, Storage Node of Table I), and a management module, each of which can be implemented as a separate processor executable or machine implemented module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enables the respective nodes 208.1-208.3 to connect to one or more of the client systems 204.1-204.2 over the computer network 206 (similar to network 153, FIG. 1A), while the storage modules 216.1-216.3 connect to one or more of the storage devices 212.1-212.3.

The management modules 218.1-218.3 provide management functions within the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network modules 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network modules 214.1, 214.3 for clarity of illustration.

The clustered storage system 202 can be organized into any suitable number of virtual servers (VServers or storage virtual machines (SVMs)) 222A-222N, in which each virtual storage system represents a single storage system namespace with separate network access. Each virtual storage system has a user domain and a security domain that are separate from the user and security domains of other virtual storage systems. Server systems 204 can access storage space via a VServer from any node of the clustered system 202.

Each of the nodes 208.1-208.3 may be defined as a computer adapted to provide application services to one or more of the client systems 204.1-204.2. In this context, a SVM is an instance of an application service provided to a client system. The nodes 208.1-208.3 are interconnected by the switching fabric 210, which, for example, may be embodied as a Gigabit Ethernet switch or any other network switch type.

Although FIG. 2A depicts three network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

The server systems 204.1-204.2 (similar to host 104) of FIG. 2A may be implemented as computing devices configured to interact with the respective nodes 208.1-208.3 in accordance with a client/server model of information delivery. In the presently disclosed aspect, the interaction between the server systems 204.1-204.2 and the nodes 208.1-208.3 enable the provision of network data storage services. Specifically, each server system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The server systems 204.1-204.2 may issue packets according to file-based access protocols, such as the NFS or CIFS protocol, when accessing information in the form of files and directories.

In a typical mode of operation, one of the server systems 204.1-204.2 transmits an NFS or CIFS request for data to one of the nodes 208.1-208.3 within the clustered storage system 202, and the VIF 220 associated with the respective node receives the client request. It is noted that each VIF 220 within the clustered system 202 is a network endpoint having an associated IP address (i.e., the target storage system IP address). The server request typically includes a file handle for a data file stored in a specified volume on at storage 212.1-212.3. The RAU 101 obtains the IP address and the volume identifier from the file handle, as described above in detail.

Figure 2B:
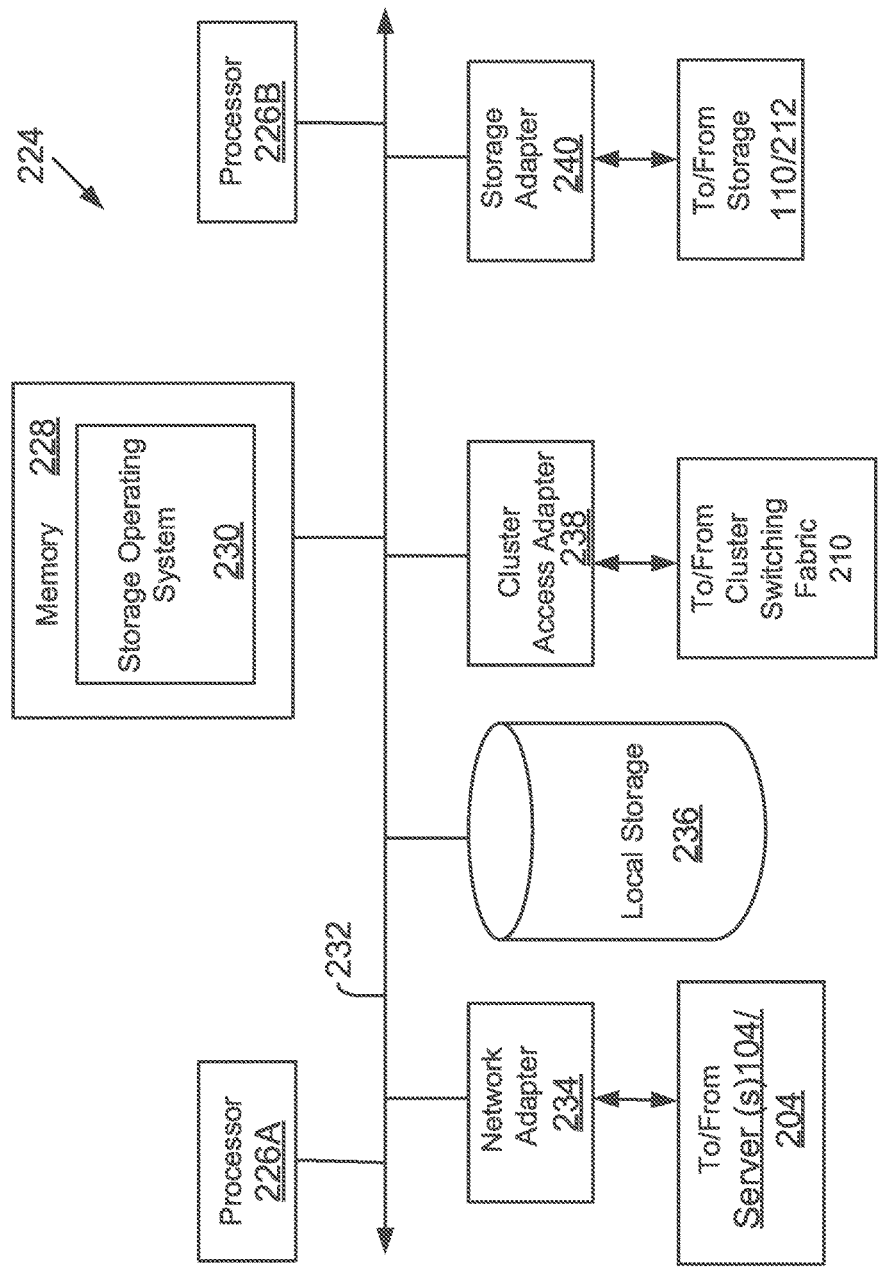
FIG. 2B shows an example of a storage system node, used according to one aspect of the present disclosure.

Storage System Node: FIG. 2B is a block diagram of a computing system 224, according to one aspect. System 224 may be used by a stand-alone storage system 108 and/or a storage system node operating within a cluster based storage system described above with respect to FIG. 2A.

System 224 may include a plurality of processors 226A and 226B, a memory 228, a network adapter 234, a cluster access adapter 238 (used for a cluster environment), a storage adapter 240, and local storage 236 interconnected by a system bus 232. The local storage 236 comprises one or more storage devices, such as disks, utilized by the processors to locally store configuration and other information.

The cluster access adapter 238 comprises a plurality of ports adapted to couple system 224 to other nodes of a cluster as described above with respect to FIG. 2A. In the illustrative aspect, Ethernet may be used as the clustering protocol and interconnect media, although it will be apparent to those skilled in the art that other types of protocols and interconnects may be utilized within the cluster architecture described herein.

System 224 is illustratively embodied as a dual processor storage system executing a storage operating system 230 that preferably implements a high-level module, such as a file system, to logically organize information as a hierarchical structure of named directories, files and special types of files called virtual disks (hereinafter generally "blocks") on storage devices 110/212. However, it will be apparent to those of ordinary skill in the art that the system 224 may alternatively comprise a single or more than two processor systems. Illustratively, one processor 226 executes the functions of a network module on a node, while the other processor 226B executes the functions of a storage module.

The memory 228 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions described herein. Memory 228 may also be used as a cache for processing I/O requests.

The storage operating system 230, portions of which are typically resident in memory and executed by the processing elements, functionally organizes the system 224 by, inter alia, invoking storage operations in support of the storage service provided by storage system 108. An example of operating system 230 is DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 234 comprises a plurality of ports adapted to couple the system 224 to one or more server systems 104 over point-to-point links, wide area networks, virtual private networks implemented over a public network (Internet) or a shared local area network using network 153 and network switch 120. The network adapter 234 thus may comprise the mechanical, electrical and signaling circuitry needed to connect storage system 108 to the network. Illustratively, the computer network may be embodied as an Ethernet network or a FC network.

The storage adapter 240 cooperates with the storage operating system 230 executing on the system 224 to access information requested by the server systems 104 and management system 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 240 comprises a plurality of ports having input/output (I/O) interface circuitry that couples to the disks over an I/O interconnect arrangement, such as a conventional high-performance, FC link topology with a storage switch (not shown). In another aspect, instead of using a separate network and storage adapter, a converged adapter is used to process both network and storage traffic.

Figure 3:
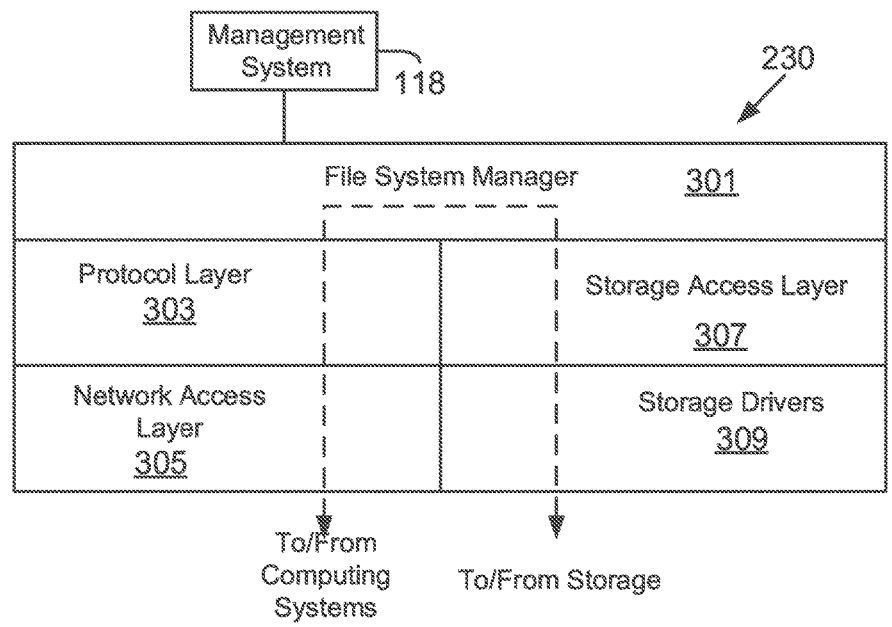
FIG. 3 shows an example of a storage operating system, used according to one aspect of the present disclosure.

Operating System: FIG. 3 illustrates a generic example of operating system 230 executed by storage system 108, according to one aspect of the present disclosure. Storage operating system 230 interfaces with the management system 118 and provides information for the various data structures maintained by the management system 118, described above in detail.

As an example, operating system 230 may include several modules, or "layers". These layers include a file system manager 303 that keeps track of a directory structure (hierarchy) of the data stored in storage devices and manages read/write operations, i.e., executes read/write operations on disks in response to server system 104 requests.

Operating system 230 may also include a protocol layer 303 and an associated network access layer 305, to allow system 200 to communicate over a network with other systems, such as server system 104 and management system 118. Protocol layer 303 may implement one or more of various higher-level network protocols, such as NFS, CIFS, Hypertext Transfer Protocol (HTTP), TCP/IP, and others.

Network access layer 305 may include one or more drivers, which implement one or more lower-level protocols to communicate over the network, such as Ethernet. Interactions between server systems 104 and mass storage devices 110/212 are illustrated schematically as a path, which illustrates the flow of data through operating system 230.

The operating system 230 may also include a storage access layer 307 and an associated storage driver layer 309 to communicate with a storage device. The storage access layer 307 may implement a higher-level disk storage protocol, such as RAID, while the storage driver layer 309 may implement a lower-level storage device access protocol, such as FC or SCSI.

It should be noted that the software "path" through the operating system layers described above needed to perform data storage access for a client request may alternatively be implemented in hardware. That is, in an alternate aspect of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network, and a disk assembly directly-attached to a client or host computer. The term "storage system" should therefore be taken broadly to include such arrangements in addition to any subsystems configured to perform a storage function and associated with other equipment or systems.

Figure 4:
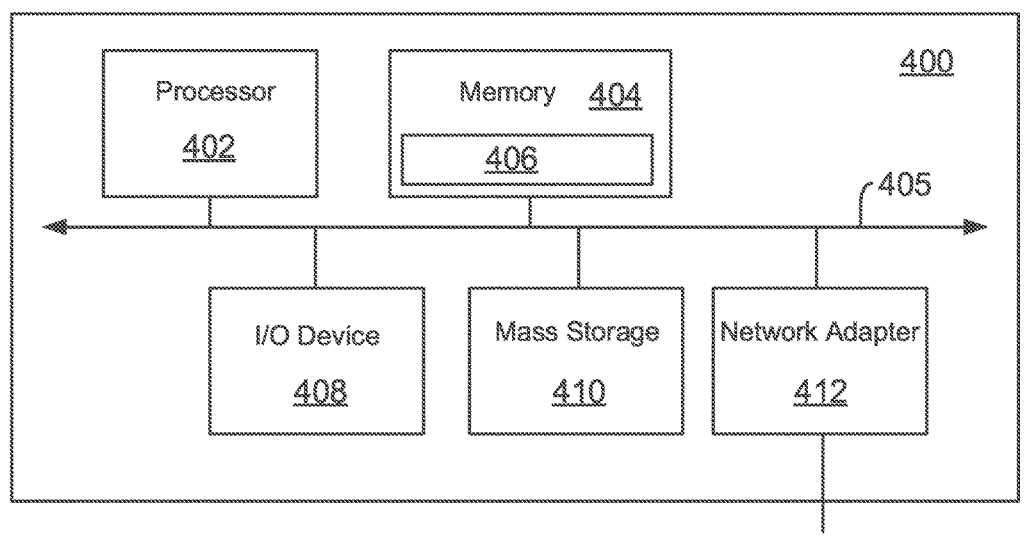
FIG. 4 shows an example of a processing system, used according to one aspect of the present disclosure.

Processing System: FIG. 4 is a high-level block diagram showing an example of the architecture of a processing system, at a high level, in which executable instructions as described above can be implemented. The processing system 400 can represent modules of RAU 101, management system 118, user console 102, server systems 104, storage system 108, and others. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain aspects, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for Packet Analysis Service 101G, performance module 140, acquisition module 144, configuration module 142, GUI 136 as well as instructions for executing the process blocks of FIGS. 1I/1J.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 (for example, network interface 101A, FIG. 1C) provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing: The system and techniques described above are applicable and useful in the cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications over the Internet online which are accessed from another service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management system 118 (and associated methods thereof) and storage systems described above can be a part of the server layer for providing storage services. Details regarding these layers are not germane to the inventive aspects.

Thus, a method and apparatus for managing resources within system 100 have been described. Note that references throughout this specification to "one aspect" or "an aspect" mean that a particular feature, structure or characteristic described in connection with the aspect is included in at least one aspect of the present invention. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
receiving a plurality of requests from a plurality of client systems at a plurality of ports of a network switch for reading and writing data in a networked storage system where a plurality of storage devices are accessed by the plurality of client systems via the plurality of ports of the network switch;
wherein each request includes a transport layer packet, a source network access address used by each client system to send each request, a target network access address for a storage system managing one or more storage devices, an application layer protocol data unit that encapsulates a file system request with encoded information for a storage volume and an indicator indicating an operation type for each request;
mirroring the plurality of requests and transmitting the mirrored plurality of requests by a dedicated mirror port of the network switch to a remote acquisition unit;
assembling, by the remote acquisition unit, transport layer packets from the mirrored plurality of requests;
extracting, by the remote acquisition unit, application layer protocol data units from the assembled transport layer packets;
parsing, by the remote acquisition unit, the application layer protocol data units to obtain file system requests;
identifying, by the remote acquisition unit, storage volume identifiers from the parsed file system requests that are associated with a greatest number of operations;
identifying, by the remote acquisition unit, network access addresses for client systems initiating the greatest number of operations for the storage volumes and network access addresses of target storage systems managing the storage volumes; and
providing, by the remote acquisition unit, a total number of operations for the plurality of requests in a given time, the identified storage volume identifiers, the network access addresses of the client systems and the network access addresses of the target storage systems to a management console.

2. The method of claim 1, further comprising:
executing a storage monitoring layer by the management console for tracking performance of storage resources of the networked storage system; and
executing a server monitoring layer by the management console for tracking computing resources using the storage resources of the networked storage system.

3. The method of claim 2, wherein the management console translates the identified storage volume identifiers received from the remote acquisition unit to internal storage volume identifiers tracked by the storage monitoring layer.

4. The method of claim 2, wherein based on data from the storage monitoring layer, the server monitoring layer, the identified storage volumes identifiers, the network access addresses of the client systems, and the network access addresses of the target storage systems, the management console creates an object that associates a compute resource with an internal volume for tracking performance of resources associated with the internal volume for storing and retrieving data.

5. The method of claim 1, wherein the file system requests are network file system (NFS) requests.

6. The method of claim 2, wherein the plurality of resources includes a storage pool having the plurality of storage devices.

7. The method of claim 1, wherein the transport layer packets are TCP packets, the application layer protocol data unit is a remote procedure call (RPC) protocol data unit and network access addresses for the client systems and the target storage systems are Internet Protocol (IP) addresses.

8. A non-transitory machine-readable storage medium having stored thereon instructions for performing a method, comprising machine executable code, which when executed by at least one machine, causes the machine to:
receive a plurality of requests from a plurality of client systems at a plurality of ports of a network switch for reading and writing data in a networked storage system where a plurality of storage devices are accessed by the plurality of client systems via the plurality of ports of the network switch;
wherein each request includes a transport layer packet, a source network access address used by each client system to send each request, a target network access address for a storage system managing one or more storage devices, an application layer protocol data unit that encapsulates a file system request with encoded information for a storage volume and an indicator indicating an operation type for each request;
mirror the plurality of requests and transmitting the mirrored plurality of requests by a dedicated mirror port of the network switch to a remote acquisition unit;
assemble, by the remote acquisition unit, transport layer packets from the mirrored plurality of requests;
extract, by the remote acquisition unit, application layer protocol data units from the assembled transport layer packets;
parse, by the remote acquisition unit, the application layer protocol data units to obtain file system requests;
identify, by the remote acquisition unit, storage volume identifiers from the parsed file system requests that are associated with a greatest number of operations;
identify, by the remote acquisition unit, network access addresses for client systems initiating the greatest number of operations for the storage volumes and network access addresses of target storage systems managing the storage volumes; and provide, by the remote acquisition unit, a total number of operations for the plurality of requests in a given time, the identified storage volume identifiers, the network access addresses of the client systems, and the network access addresses of the target storage systems to a management console.

9. The non-transitory storage medium of claim 8, wherein the management console executes a storage monitoring layer for tracking performance of storage resources of the networked storage system; and executes a server monitoring layer for tracking computing resources using the storage resources of the networked storage system.

10. The non-transitory storage medium of claim 9, wherein the management console translates the identified storage volume identifiers received from the remote acquisition unit to internal storage volume identifiers tracked by the storage monitoring layer.

11. The non-transitory storage medium of claim 9, wherein based on data from the storage monitoring layer, the server monitoring layer, the identified storage volumes identifiers, the network access addresses of the client systems, and the network access addresses of the target storage systems, the management console creates an object that associates a compute resource with an internal volume for tracking performance of resources associated with the internal volume for storing and retrieving data.

12. The non-transitory storage medium of claim 8, wherein the file system requests are network file system (NFS) requests.

13. The non-transitory storage medium of claim 9, wherein the plurality of resources includes a storage pool having the plurality of storage devices.

14. The non-transitory storage medium of claim 8, wherein the transport layer packets are TCP packets, the application layer protocol data unit is a remote procedure call (RPC) protocol data unit and network access addresses for the client systems and the target storage systems are Internet Protocol (IP) addresses.

15. A system, comprising:
a network switch having a plurality of ports; and
a remote acquisition unit coupled to a management console and a mirror port of the network switch, the remote acquisition unit having a memory containing machine readable medium comprising machine executable code having stored thereon instructions; and a processor module coupled to the memory:
wherein the network switch receives a plurality of requests from a plurality of client systems at a plurality of ports for reading and writing data in a networked storage system where a plurality of storage devices are accessed by the plurality of client systems via the plurality of ports;
wherein each request includes a transport layer packet, a source network access address used by each client system, a target network access for a storage system managing one or more storage devices, an application layer protocol data unit that encapsulates a file system request with encoded information for a storage volume and an indicator indicating an operation type for each request; and
wherein the plurality of requests are mirrored and transmitted by the mirror port of the network switch to the remote acquisition unit; and
wherein the processor module of the remote acquisition unit is configured to execute the machine executable code to:
assemble the transport layer packets from the mirrored plurality of requests;
extract the application layer protocol data units from the assembled transport layer packets;
parse the application layer protocol data units to obtain file system requests;
identify the storage volume identifiers from the parsed file system requests that are associated with a greatest number of operations;
identify network access addresses for client systems initiating the greatest number of operations for the storage volumes and network access addresses of target storage systems managing the storage volumes; and
provide a total number of operations for the plurality of requests in a given time, the identified storage volume identifiers, the network access addresses of the client systems, and the network access addresses of the target storage systems to a management console.

16. The system of claim 15, wherein the management console executes a storage monitoring layer for tracking performance of storage resources of the networked storage system; and executes a server monitoring layer for tracking computing resources using the storage resources of the networked storage system.

17. The system of claim 16, wherein the management console translates the identified storage volume identifiers received from the remote acquisition unit to internal storage volume identifiers tracked by the storage monitoring layer.

18. The system of claim 16, wherein based on data from the storage monitoring layer, the server monitoring layer, the identified storage volumes identifiers, the network access addresses of the client systems, and the network access addresses of the target storage systems, the management console creates an object that associates a compute resource with an internal volume for tracking performance of resources associated with the internal volume for storing and retrieving data.

19. The system of claim 16, wherein the plurality of resources includes a storage pool having the plurality of storage devices.

20. The system of claim 15, wherein the file system requests are network file system (NFS) requests, the transport layer packets are TCP packets, the application layer protocol data unit is a remote procedure call (RPC) protocol data unit, and network access addresses for the client systems and the target storage systems are Internet Protocol (IP) addresses.

* * * * *